June 10, 1958   W. SCHNEIDER   2,837,956
THEODOLITE HAVING SCALE READING MEANS
Filed July 26, 1954   2 Sheets-Sheet 1

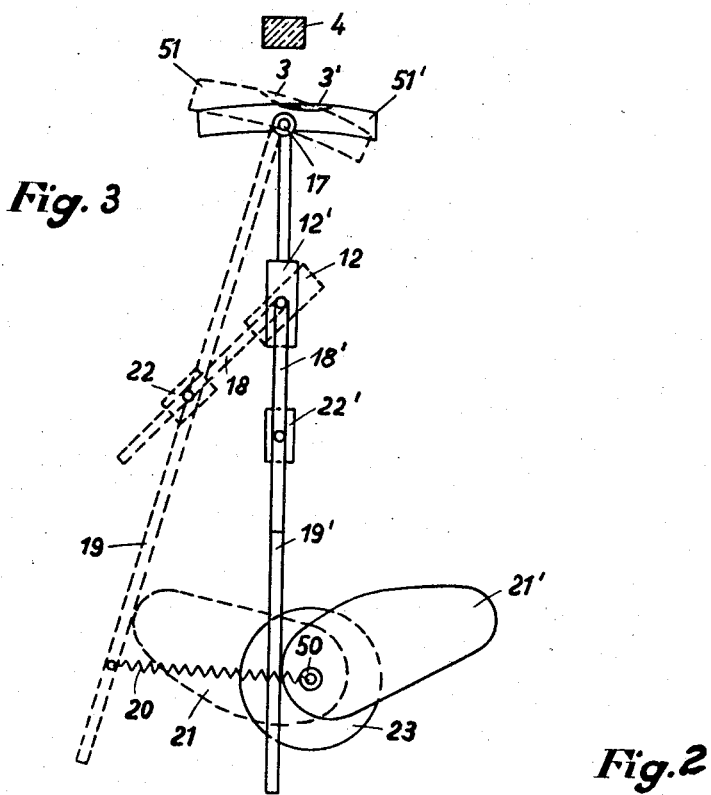

United States Patent Office 2,837,956
Patented June 10, 1958

2,837,956

THEODOLITE HAVING SCALE READING MEANS

Wilhelm Schneider, Konigsbronn, Germany, assignor to Carl Zeiss, Heidenheim on the Brenz, Wurttemberg, Germany Application July 26, 1954, Serial No. 450,399

Claims priority, application Germany August 22, 1953

6 Claims. (Cl. 88—1)

This invention concerns a geodetic instrument of the theodolite type, with a tubular level and a micrometer for reading vertical angles. In instruments of this kind so far known, measurement of vertical angles requires centering the tubular level prior to each vertical circle reading, if the result is to be free from residual horizontal error. This centering of the level represents a particularly fine setting operation which takes time and must not be omitted, as otherwise inaccurate results will be obtained.

In the instrument of this invention, these drawbacks are eliminated by having the level tiltably mounted and so coupled that it inclines in setting the micrometer, and by providing a scale on which at least one bubble end of the level registers the value corresponding to its inclination. For setting the micrometer, the image of an index mark is to advantage projected by way of an inclinable plane-parallel plate on to a coarse-reading scale. The image of this mark is shifted along the scale in inclining the plane plate, which is linked to the level by a rotative transmission. Whenever, by tilting the plane plate, the reading index is brought into coincidence with a graduation stroke on the coarse-reading scale, the level is inclined in proportion, and at least one bubble end of it registers, on the scale provided, a value corresponding to the deflection of the index.

The transmission ratio between the plane plate and the tubular level is such that, in a shift of the image of the index by one interval on the coarse-reading scale, the bubble end ranges along the entire scale for the inclination of the level, so that this scale can be used for fine-reading the vertical angle. Since the bubble, however, not only moves in the coincidence setting but also when the instrument as a whole is not accurately horizontal, these two deflections always add up. This means that to the measured value of the coincidence setting and which contains an error in coarse-leveling of a magnitude identical with the deviation of the instrument from the horizontal, this deviation adds itself at each and every measurement, so that the result is free from leveling error.

The inclination of the plane plate and the tubular level is best effected by rods attached to either of these parts, the swinging movements of which around points on the level and the plate are governed by a rotatable plate cam, on the edge of which one of these rods slides. The other rod is so connected with the first rod as to be slidable relative to this rod lengthwise of its axis. By choosing the point of junction, it so becomes possible to obtain any desired ratio of the tilting movements of the tubular level and the plane plate. It will be of advantage to project into a common reading window also the scales provided for the coincidence setting and for the bubble reading. The bubble reading scale may be located either on the level or in the reading window. In the first case bubble and scale may be imaged into the reading window.

In the last case the bubble alone will be projected into this window. A graduation stroke of the vertical circle scale can be used to advantage as a movable index for the coincidence setting.

The level and the micrometer are both contained in one of the uprights of the instrument housing. In the case of the invention, this is possible because it is no longer necessary to view the bubble directly with the eye, since the centering operation is eliminated. By this arrangement, the level is moreover protected from damage, disadjustment, and influences of the weather and of the user's hands or breath. Illumination of the level is best effected through the same light entry opening as for the micrometer. A tubular level of constant bubble length is used.

The attached drawings show an embodiment of the invention:

Fig. 1 is a partial section through a theodolite as shown in the U. S. A. patent specification 2,552,893, Fig. 1, but with a vertical circle reading arrangement according to the invention.

Fig. 2 shows the reading window of the theodolite of Fig. 1;

Fig. 3 is a section along the line III—III of Fig. 1;

Fig. 4 is a view along the line IV—IV of Fig. 1.

Figure 1:
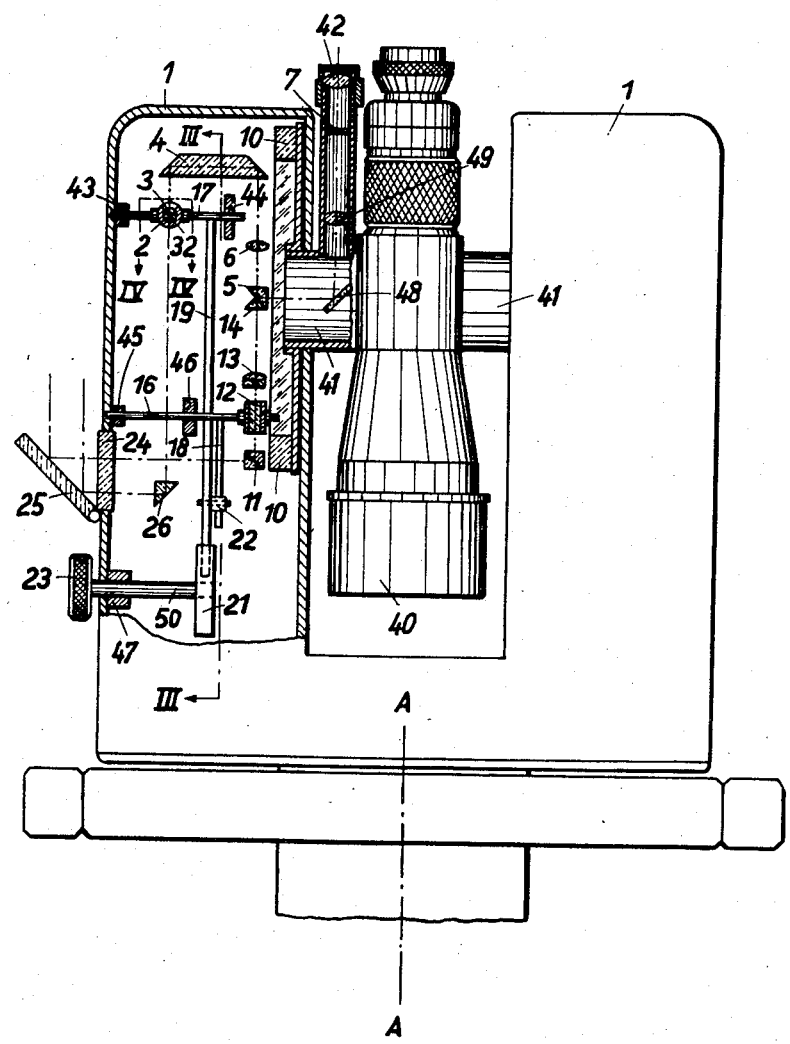

In Fig. 1 a telescope 40 is fixedly connected to a shaft 41 turnably mounted in hollow uprights 1. A reading device 42 is fixedly connected with shaft 41 so as to turn with telescope 40. Shaft 40 carries a vertical circle 10. In the left upright 1 a level 51 is disposed consisting of a carrier 32, carrying a hollow glass body 2 partly filled with a fluid to let a bubble 3 in its interior. Said carrier 32 is connected with a shaft 17 which is turnably mounted in bearings 43 and 44. An image of the bubble 3 is projected through prisms 4 and 5 and a lens 6 via a further mirror 48 and a lens 49 into a reading window 7. Also arranged in window 7, Fig. 2, is a scale 8 graduated in $\frac{1}{100}$ grads, and on which one end 9 of bubble 3 registers a value.

In turning telescope 41, circle 10 moves relative to a prism 11. The angular value of telescope 41 appears in front of this prism 11. By way of an inclinable plane parallel plate 12, a lens 13, and a prism 14 as well as the further mirror 48 and the lens 49 an image of this mark of circle 10 appearing in front of the prism 11 is formed in window 7 serving as a first reading scale. With a graduation stroke of vertical circle 10, in Fig. 2 identified as graduation 91, a decimal value of the angle of the telescope tilt can be read from a second scale 15 arranged in said window 7. Plane parallel plate 12 is connected with a shaft 16 turnably mounted in bearings 45 and 46. Shaft 16 is fixedly connected with a rod 18. Shaft 17 of level 51 is fixedly connected with a rod 19. Rod 18 is slidable in a sleeve 22, which in turn pivots on rod 19. Rod 19 acts as a follower by being urged against cam 21 under the pull of a spring 20, Fig. 3. Cam 21 is carried by a shaft 50 turnably mounted in a bearing 47 of upright 1. This shaft 50 carries a micrometer knob 23.

By working said micrometer knob 23, cam 21 can be turned, for instance from its dotted line position 21 in Fig. 3 into position 21'. At the same time, rod 19 turns into the position 19' and level 51 as well as rod 18 and plate 12 execute a corresponding angular rotation.

Further accommodated in upright 1 are an illumination window 24, a mirror 25, and a prism 26, Fig. 1. This arrangement allows light to fall both on vertical circle 10 and on level 2.

The hollow uprights are turnable around a vertical axis A—A. The angular value of this turning appears in windows 30 and 31, Fig. 2, by projection of a part of the horizontal scale not shown in these windows in known manner.

As shown in Fig. 4, scale 8 may be arranged as a scale 8' on the glass body 2 of the level. Prisms 4 and 5 and lens 6 and the further optical elements 48 and 49 then produce an image of bubble 3 and scale 8' in window 7. This image of scale 8' replaces the scale 8 in Fig. 2. If the level 51 will be inclined bubble 3 moves along the scale 8'.

The mode of action of this theodolite is as follows:

When the instrument is coarse-leveled (by an arrangement not shown in the drawing), bubble end 9 of level 2 registers a value on the third scale 8 in window 7, for instance in the dotted-line position of Fig. 2 the value 1.5. By means of the telescope connected to circle 10, the target is now sighted. In this operation, circle 10 is turned from its zero position by a certain angle. This angle, in Fig. 2 the angle 91°, appears in the field of scale 15.

If circle graduation 91 does not register on an interval stroke of scale 15 as shown in Fig. 2 by the dotted line, micrometer knob 23 is now actuated. This causes plate 12 to incline in the manner described and effects a parallel displacement of the light rays proceeding from prism 11, thereby inducing a movement of graduation 91. Micrometer knob 23 is now turned until graduation 91 comes into coincidence with a graduation of scale 15, which in Fig. 2 is graduation three. Now the value 91.3° can be read from scale 15. By turning micrometer 23, level 2 has also been tilted. In this action, the bubble end has advanced by 5 intervals on scale 8 and now registers a value of 6.5. This value is added to the reading of 91.3°, giving the exact reading as 91.365°. The same value would result if the instrument had been accurately leveled prior to measurement, since then bubble end 9 would have registered zero on scale 8, while the telescope would have had to be turned on by an angle of 0.015°.

I claim:

1. In a geodetic instrument, especially one of the theodolite type having a telescope and a coarse reading scale connected with said telescope to give vertical angles of the telescope, a reading window, a second scale arranged in said window to give decimal values of said telescope angles, optical means projecting a scale mark of said coarse reading scale on said second scale to serve as index mark for reading said decimal values on said second scale, means arranged in the ray path between said scale mark imaged in said reading window and said window to shift the image of said coarse reading scale mark along said second scale for coincidence setting of said mark with one of the marks of said second scale, an inclinable tubular level, a third scale arranged in said reading window to give decimal values of the second scale values and further optical means projecting at least one bubble end of said tubular level on said third scale, said bubble end serving as index mark for reading a value on said third scale, further means coupling said inclinable tubular level with said means shifting the image of said coarse reading scale mark along said second scale for coincidence setting so that in doing so said level turns and its bubble as well as the image of the bubble displaces along said third scale to give a value on said scale corresponding to the shift of said index mark along the second scale.

2. A geodetic instrument according to claim 1, characterized in that the means for shifting the index mark along said second scale consists in an inclinable plane-parallel plate arranged in the ray path between said coarse reading scale mark imaged in said reading window and said reading window laterally displacing the rays transmitting it in dependence of its inclination, and that said further means coupling said plane-parallel plate with said level to turn said level in inclining said plane-parallel plate effects a turning of said level of such amount that in shifting the index mark by one graduation of the second scale, the bubble end passes along the entire third scale.

3. A geodetic instrument according to claim 1, characterized in that the means for shifting the index mark along said second scale consists in an inclinable plane-parallel plate arranged in the ray path between said scale mark and said reading window lateral displacing the rays transmitting it in dependence of its inclination and that the further means coupling said inclinable plane-parallel plate and said inclinable tubular level consists in a cam plate and two rods, one end of the first rod sliding on the cam periphery and the other end being connected to said level, while the second rod is connected to said plane-parallel plate with its one end and pivotally connected to said first rod with its other end, both rods turning the level and the plane-parallel plate in turning the cam plate.

4. In a geodetic instrument, especially one of the theodolite type having a telescope and a coarse reading scale connected with said telescope to give vertical angles of said telescope, a reading window, a second scale arranged in said window to give decimal values of said telescope angles, optical means projecting a scale mark of said coarse reading scale on said second scale, the image of said mark serving as index mark for reading said decimal values on said second scale, means shifting the image of said coarse reading scale mark along said second scale for coincidence setting of said mark with one of the marks of said second scale, an inclinable tubular level, said level consisting of a glass body, a fluid and a bubble inside of said glass body, a third scale located on said glass body to give decimal values of the second scale values and further optical means projecting at least one bubble end of said tubular level and said third scale into the reading window, said bubble end serving as index mark for reading a value on said third scale, further means coupling said inclinable tubular level with said means shifting said index mark along the said second scale so that in doing so said level turns and its bubble displaces along said third scale to give a value on said scale corresponding to the shift of said index mark along the second scale.

5. A geodetic instrument according to claim 1, characterized in that it has a housing, the inclinable level being arranged inside of said housing.

6. A geodetic instrument according to claim 1, characterized in that the inclinable tubular level has a constant bubble length.

References Cited in the file of this patent

UNITED STATES PATENTS

| 2,552,893 | Hillman et al. | May 15, 1951 |

FOREIGN PATENTS

| 5,412 | Great Britain | Mar. 4, 1912 |
| 557,349 | Germany | Aug. 22, 1932 |
| 377,619 | Italy | Dec. 23, 1939 |